United States Patent
Arndt et al.

(10) Patent No.: US 8,561,569 B2
(45) Date of Patent: Oct. 22, 2013

(54) METHOD FOR COATING THE INNER WALLS OF PIPES AND DEVICE SUITABLE THEREFOR

(75) Inventors: Frank Arndt, Berlin (DE); Jens Dahl Jensen, Berlin (DE); Ursus Krüger, Berlin (DE); Gabriele Winkler, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 930 days.

(21) Appl. No.: 12/666,847

(22) PCT Filed: Jun. 13, 2008

(86) PCT No.: PCT/EP2008/057463
§ 371 (c)(1),
(2), (4) Date: Dec. 28, 2009

(87) PCT Pub. No.: WO2009/000675
PCT Pub. Date: Dec. 31, 2008

(65) Prior Publication Data
US 2010/0189895 A1 Jul. 29, 2010

(30) Foreign Application Priority Data
Jun. 27, 2007 (DE) .......... 10 2007 030 591

(51) Int. Cl.
*B05B 13/06* (2006.01)
*B05D 7/22* (2006.01)

(52) U.S. Cl.
CPC .. *B05B 13/06* (2013.01); *B05D 7/22* (2013.01)
USPC ........... 118/317; 427/230; 427/233; 427/234; 427/239

(58) Field of Classification Search
CPC .................................. B05B 13/06; B05D 7/22
USPC .................... 427/230–239; 118/317
See application file for complete search history.

(56) References Cited

U.S. PATENT DOCUMENTS

| | | | |
|---|---|---|---|
| 3,376,151 A * | 4/1968 | Nishikawa et al. ........... | 427/234 |
| 2002/0041928 A1 | 4/2002 | Budaragin ................... | 427/229 |
| 2002/0086111 A1 | 7/2002 | Byun et al. ............. | 427/255.394 |
| 2005/0255240 A1 | 11/2005 | Okamoto et al. ............ | 427/230 |
| 2006/0191687 A1 | 8/2006 | Storm et al. .................. | 166/302 |

FOREIGN PATENT DOCUMENTS

| | | |
|---|---|---|
| WO | 03/021004 A1 | 3/2003 |
| WO | 2004/013378 A1 | 2/2004 |
| WO | 2004/104261 | 12/2004 |

OTHER PUBLICATIONS

International PCT Search Report, PCT/EP2008/057463, 3 pages, Mailed Jan. 26, 2009.
German Office Action, German application 10 2007 030 591.7, 3 pages, Jan. 15, 2008.

* cited by examiner

*Primary Examiner* — William Phillip Fletcher, III
(74) *Attorney, Agent, or Firm* — King & Spalding L.L.P.

(57) ABSTRACT

A combined heating and cooling device for coating the inner walls of pipes may include heating areas and cooling areas. This device can be guided along the pipe to be coated, wherein a fluid containing the coating active agent is supplied to the interior of the pipe. The combined heating and cooling treatment for the pipe supports the process of coating formation. The cooling process is subject to a desired profile by the use of the cooling area and is not determined by chance.

13 Claims, 2 Drawing Sheets

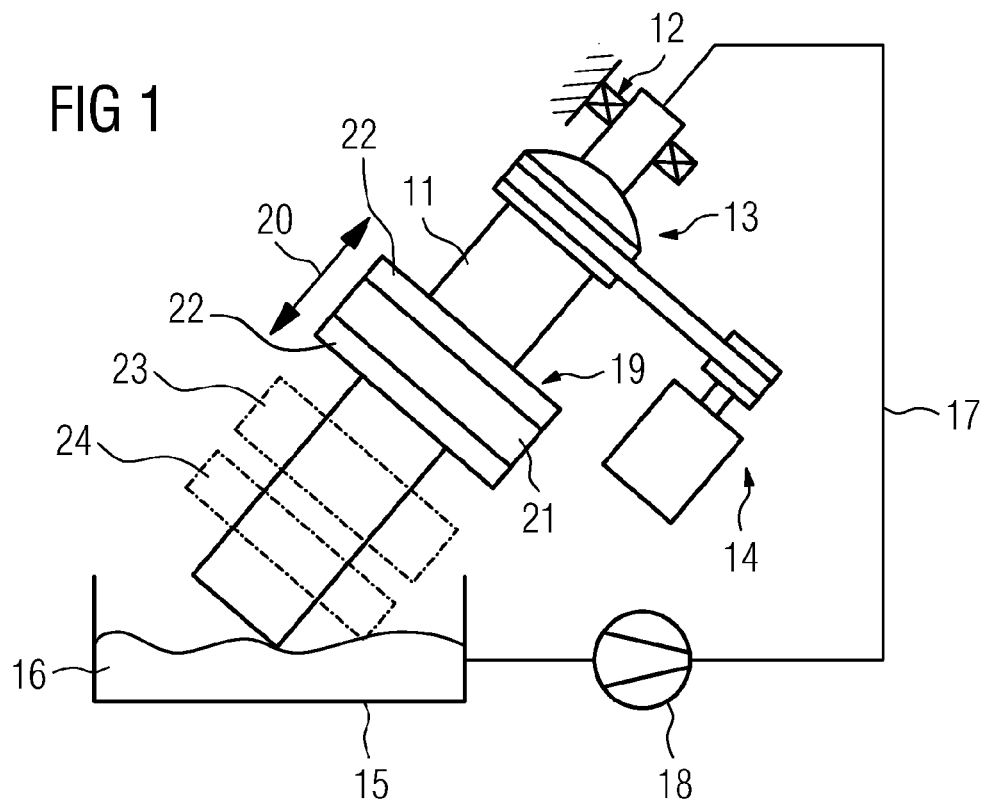
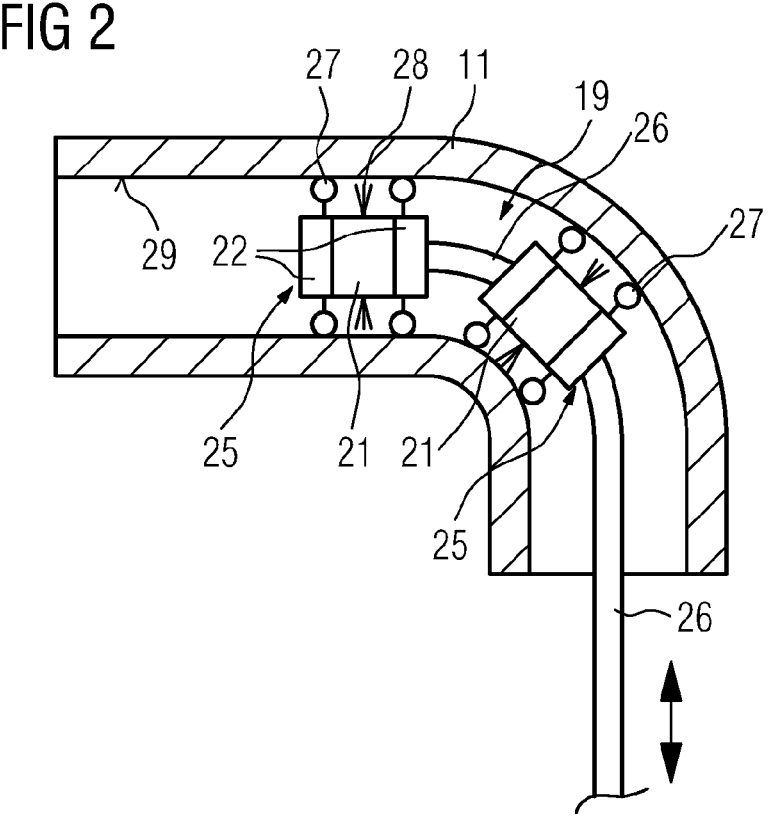

METHOD FOR COATING THE INNER WALLS OF PIPES AND DEVICE SUITABLE THEREFOR

CROSS-REFERENCE TO RELATED APPLICATIONS

This application is a U.S. National Stage Application of International Application No. PCT/EP2008/057463 filed Jun. 13, 2008, which designates the United States of America, and claims priority to German Application No. 10 2007 030 591.7 filed Jun. 27, 2007, the contents of which are hereby incorporated by reference in their entirety.

TECHNICAL FIELD

The invention relates to a process for coating the inner walls of pipes, in which a fluid containing the coating material is fed into the pipe. During the coating process, a mobile heating device is used to heat the pipe locally to a temperature required to form the coating until the layer formation process is completed locally. The heating device then continues to be moved until the layer to be formed is completed, i.e. the pipe is gradually heated in the entire inner region to be coated. After coating has been carried out, the remaining fluid is removed from the pipe again. The fluid has to be suitable as a carrier for the coating material. It can be both liquefied and gaseous. It is also possible for the fluid to be formed exclusively by the coating material itself, said coating material being deposited directly on the inner walls by subjecting the pipe to heat treatment.

BACKGROUND

A process of the type mentioned in the introduction is described, for example, in US 2005/0255240 A1, in which pipes having a relatively narrow cross section are intended to be coated from the inside. This is done by immersing these pipes in a solution containing the coating material, said solution being sucked into the pipes owing to the effective capillary forces. This process can be further assisted by applying a vacuum to the free end of the pipe. As soon as the pipe is filled with the fluid, a sleeve which surrounds the pipe is used to introduce thermal energy into said pipe, this treatment being started at the free end, i.e. the end which is not immersed in the fluid. The solvent is thereby evaporated and leaves the pipe at the top, while the polymer dissolved in the solvent is deposited on the inner walls of the pipe. When the heating sleeve reaches the opposite end of the pipe, the coating process is complete and the layer is completed. As soon as the sleeve has locally heated a point on the pipe and is moved on, this point cools down to room temperature again.

SUMMARY

According to various embodiments, a process for coating inner walls of pipes can be specified which makes it possible to influence the layer formation process in a comparatively effective manner.

According to an embodiment, in a process for coating the inner walls of pipes, —a fluid containing the coating material is fed into the pipe, —a mobile heating device is used to heat the pipe locally to a temperature required to form the coating until the layer formation process is completed locally, and the heating device continues to be moved until the layer to be formed is completed, and—the remaining fluid is removed from the pipe, and wherein a mobile cooling device supports the local cooling of the pipe after the layer has been formed.

According to a further embodiment, a plurality of heating devices and cooling devices can be used at the same time. According to a further embodiment, the at least one cooling device and the at least one heating device can be moved continuously along the longitudinal extent of the pipe, wherein the speed is selected subject to the local heating and cooling duration required. According to a further embodiment, the fluid may contain precursors for a ceramic which are chemically converted to give a metal compound which forms the ceramic, with the layer being formed. According to a further embodiment, the fluid can be liquefied and the pipe may have a straight profile, wherein the pipe is held at an angle of more than 0° and at most 90° to gravitational acceleration and is rotated during the coating process.

According to another embodiment, a combined heating and cooling device for a pipe, may have at least one heating region and at least one cooling region which are arranged in succession in the direction of the longitudinal extent of the pipe, wherein both the heating region and the cooling region are adapted to the cross section of the pipe in such a manner that the heating and the cooling are uniform over the circumference of the pipe in the region of influence of the heating region and of the cooling region.

According to a further embodiment, a cooling device can be arranged at each end of said device. According to a further embodiment, a plurality of heating regions and cooling regions can be arranged in succession. According to a further embodiment, the device may be in the form of a sleeve which surrounds the pipe. According to a further embodiment, the device can be in the form of a probe for the inside of the pipe. According to a further embodiment, a supply device for the fluid can be integrated in the probe and can be used to direct a stream of fluid onto the inner wall of the pipe.

BRIEF DESCRIPTION OF THE DRAWINGS

Further details of the invention are described below with reference to the drawing. Identical or corresponding elements in the drawing are provided with the same reference symbols in each case and are explained repeatedly only where there are differences between the individual figures. In the drawing:

FIG. 1 schematically shows an exemplary embodiment of the process, with an exemplary embodiment of a sleeve-like heating and cooling device, FIG. 2 shows another exemplary embodiment of the process, with an exemplary embodiment of the probe-like heating and cooling device being used.

DETAILED DESCRIPTION

Figure 3:
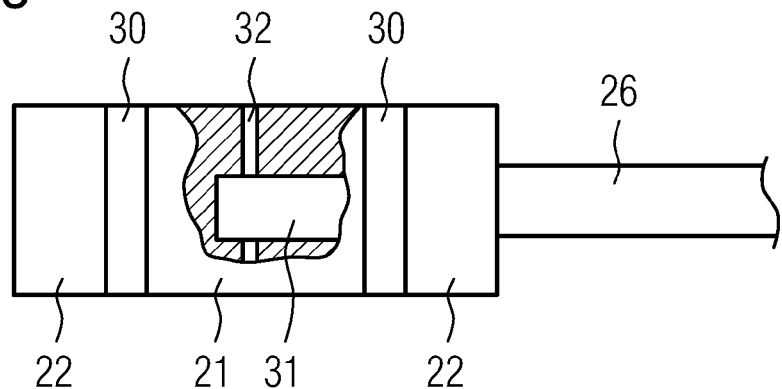
FIGS. 3 to 5 show various exemplary embodiments of the heating and cooling device.

According to various embodiments, a mobile cooling device supports the local cooling of the pipe after the layer has been formed. This means that it is not only possible to specifically influence the heating process by means of the heating device by modifying the coating parameters, but also the cooling process. This is advantageous in the case of layers with properties which depend on the cooling rate. Therefore, this advantageously makes it possible to additionally influence the layer formation process.

According to an embodiment, a plurality of heating devices and cooling devices are used at the same time. This makes it possible to carry out a layer formation process of the pipe at a plurality of points at the same time, it advantageously being possible to reduce the process duration, for example in the case of long pipes. The heating devices and cooling devices can also be arranged in a cascade-like manner, i.e. heating devices and cooling devices are guided along the pipe wall alternately such that a coating process is carried out repeatedly. This is advantageous particularly when only thin coating thicknesses can be produced by the layer formation process, and therefore said process has to be repeated several times. This advantageously makes it possible to reduce the process duration.

Another embodiment provides that the at least one cooling device and the at least one heating device are moved continuously along the longitudinal extent of the pipe, wherein the speed is selected subject to the local heating and cooling duration required. This means that the length of the heating or cooling device in the direction of movement has to be coordinated with the movement speed such that a specific point on the pipe wall is located underneath the heating or cooling device moving away over the pipe wall during the required time interval. In addition, the length ratio between the heating and cooling device has to be dimensioned such that it corresponds to the ratio of the required time intervals for the heating treatment or the cooling treatment. The advantage of a continuous movement of the heating or cooling device is that the layer is likewise continuously built up locally and therefore it is possible to produce a transition-free coating over the entire length of the pipe.

The process is particularly advantageous when the fluid contains precursors for a ceramic which are chemically converted to give a metal compound which forms the ceramic, with the layer being formed. Coatings of this type, which have also become known under the name C3 coatings, allow various outstanding layer properties to be set, it being possible to obtain these properties only if the required layer formation parameters are observed precisely. Therefore, it is particularly advantageous to use an additional cooling device to the heating device when producing these types of coating.

The process of applying ceramic precursors to metallic components in order to form ceramic layers on said components is known per se and is described, for example, in US 2002/0086111 A1, WO 2004/013378 A1, US 2002/0041928 A1, WO 03/021004 A1 and WO 2004/104261 A1. The processes described in these documents relate to the production of ceramic coatings on components in general, wherein the layer is produced using ceramic precursors of the ceramics to be produced which, after they have been applied, are converted to the ceramic to be formed by heat treatment.

The ceramic precursors contain the materials of which the ceramic material of the layer to be formed is composed, and furthermore have constituents which, during the chemical conversion which proceeds when the coating material is subjected to heat treatment, lead to crosslinking of the ceramic material. Examples of ceramic precursors can be gathered from the cited prior art documents and should be selected depending on the intended application.

By way of example, it is possible that the ceramic to be formed consists of an oxide and/or a nitride and/or an oxynitride. The formation of oxides, nitrides or oxynitrides advantageously makes it possible to produce particularly stable layers. The precursors of such ceramics have to provide the elements N and/or O in order to form the oxidic, nitridic or oxynitridic ceramic.

The invention also relates to a device suitable for coating the pipes using heat treatment.

Such a device is described in US 2005/0255240 A1 (mentioned in the introduction). This device comprises a heating sleeve, the internal diameter of which is greater than the external diameter of the pipe to be coated. This heating sleeve can therefore be guided along the pipe, which makes it possible to carry out heat treatment. Heat is input from the outside of the pipe toward the inside such that the heat introduced influences the layer formation process on the inside of the pipe.

According to various embodiments, a device can be specified which is intended for supporting a layer formation process on the inside of pipes and makes it possible to control the required temperature profile in a relatively accurate manner.

According to various embodiments, a combined heating and cooling device for a pipe may have at least one heating region and at least one cooling region, wherein these regions are arranged in succession in the direction of the longitudinal extent of the pipe. According to various embodiments, both the heating region and the cooling region are adapted to the cross section of the pipe in such a manner that the heating and the cooling are uniform over the circumference of the pipe in the region of influence of the heating region and of the cooling region. This is important particularly when the pipes to be coated do not have a circular cross section. By way of example, if the cross section is rectangular, it is also necessary for the heating region and the cooling region to at least substantially follow this contour.

One embodiment provides that a cooling region is arranged at each end of the heating and cooling device. In other words, there is one cooling device more than the number of heating devices. This has the advantage that the heating and cooling device can be guided along the pipe wall in both possible directions. Specifically, first the heating and then the cooling must be carried out in both directions, and therefore the cooling region must be downstream of the heating region, as seen in the direction of movement. This is advantageously the case for the embodiment discussed.

It can be also advantageous to arrange a plurality of heating regions and cooling regions in succession. As already explained, this makes it possible to produce a cascade-like layer structure and thereby to guide the heating and cooling device along the pipe wall only once.

According to an embodiment, the heating and cooling device may be in the form of a sleeve which surrounds the pipe. Another embodiment provides that the heating and cooling device is in the form of a probe for the inside of the pipe. The sleeve-like heating and cooling device is preferably suitable for pipes with a small cross section, whereas the probe-like heating and cooling device can preferably be used for pipes with a sufficiently large cross section. The probe-like heating and cooling device has the additional advantage that it can also be used in pre-installed pipe systems since it can be displaced unhindered in the inside of the pipe even over relatively large sections of the pipeline. Specifically, a sleeve could not be displaced unhindered owing to the pipe suspensions of the pipeline system.

A probe-like heating and cooling device can advantageously be developed by integrating a supply device for the fluid in the probe, which supply device can be used to direct a stream of fluid onto the inner wall of the pipe. This advantageously makes it possible to locally feed the fluid into the inside of the pipe precisely at that point where the coating process also takes place. Particularly in the case of relatively large pipeline systems, this makes it possible to carry out a coating process which saves a relatively large amount of material because it is not necessary to flood the entire pipe system with the fluid.

FIG. 1 shows a straight pipe 11 which, for coating of the inner walls (not shown), is accommodated in a coating device. For this purpose, there is a clamping device 13 which is mounted in a positionally fixed bearing 12 and can be made to rotate by means of a motor-driven drive 14. One end of the pipe 11 is inserted into this clamping device 13.

The other end of the pipe is located in a container 15 for a fluid 16 containing the coating material. A feed line 17 can be used to feed this fluid into the clamping device using a pump 18, and this fluid then runs through the pipe to be coated back into the container 15.

The rotary movement of the pipe ensures that the entire internal circumference of the pipe is wetted at least occasionally with the fluid 16. A heating and cooling device in the form of a sleeve 19 which locally surrounds the pipe 11 is provided in order to initiate a coating process, i.e. the separation of the coating material from the fluid. A linear drive (not shown in more detail) can be used to move the sleeve 19 along the pipe along the double-headed arrow 20 indicated, a heating region 21 and a cooling region 22, which follows said heating region as seen in the direction of movement, being used in each case in the heating and cooling sleeve. Since a cooling region 22 is provided at each of the two ends of the sleeve, the sleeve can be operated in both directions of the double-headed arrow 20, in which case it is always possible for firstly local heating and then local cooling to be carried out.

As an alternative to using the heating and cooling device, it would also be possible, as indicated by the dashed-dotted lines, to use an individual heating device 23 and cooling device 24. These likewise have a sleeve-like design (in the manner already described) and can be pushed onto the pipe independently of one another. It is also possible to use any desired number of individual heating devices 23 and cooling devices 24, similar to a modular principle.

FIG. 2 schematically shows a sectional view of part of a pipeline system with the pipe 11. A heating and cooling device 19 comprising two probes 25 connected in series is inserted into said pipe. These probes 25 are connected to a supply line 26 and have rollers 27 with which they can be guided at a constant distance from the inner walls of the pipe. These rollers are shown schematically; in the case of a round cross section of the pipe, at least three rollers each at an angle of 120° with respect to one another are required on the periphery of the probes. In the exemplary embodiment shown in FIG. 2, four rollers are provided on the periphery each at an angle of 90° with respect to one another.

Analogously to the manner described in FIG. 1, each of the probes 25 is provided in the middle with a heating region 21 and at the ends with two cooling regions 22. The supply line 26 can be used to push the probes into the line system and then pull them back out. For this purpose, the supply line 26 has to be sufficiently rigid, but additionally has to have a sufficiently flexible design if curves are provided in the pipeline system. The supply line provides the probes with energy required for heating and cooling.

In addition, nozzle openings (not shown in more detail) through which a liquefied coating material can be atomized are provided in the probes. The spray jet 28 is directed at the inner wall of the pipe 11 to be coated, a fluid line also being provided in order to supply the coating material in the supply line.

FIG. 3 schematically shows the possible design of a probe, in which the rollers 27 are not shown. The heating region 21 and the cooling regions 22 are made of copper, for example, in order to ensure good conduction of heat and heat capacity. Peltier elements 30, which serve both to heat the heating region 21 and to cool the cooling regions 22, are arranged between the heating region 21 and the cooling regions 22.

FIG. 3 also shows the supply line 26 which issues into a bore hole 31 which makes it possible to supply the coating fluid to the nozzles 32.

Figure 4:
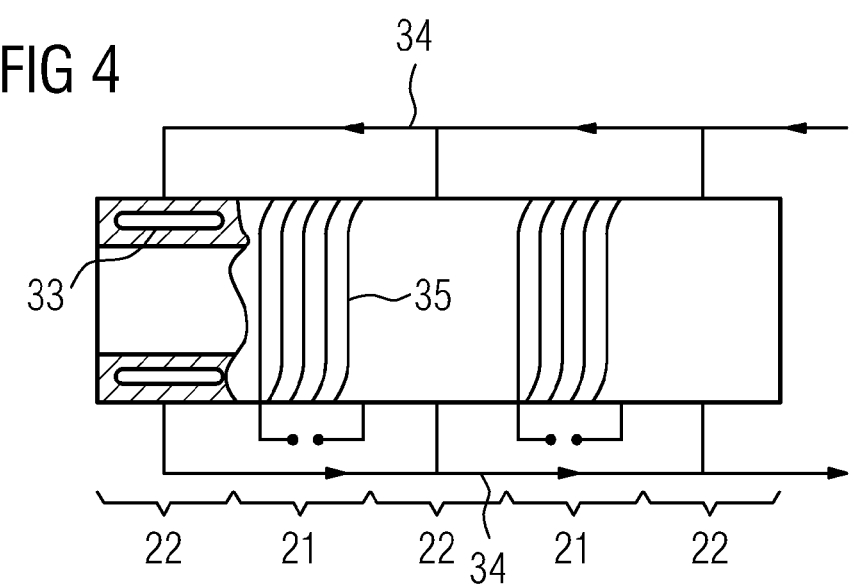

FIG. 4 shows a sleeve-like heating and cooling device. In the cooling regions 22, this has cooling ducts 33 which can be supplied with a coolant by means of a line system 34 (indicated). The heating regions 21 are provided with electrical heating wires 35. In total, there are two heating regions 21 and three cooling regions 22.

Figure 5:
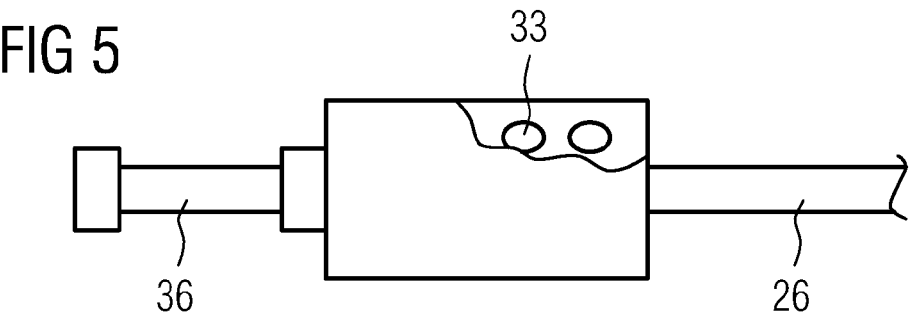

FIG. 5 shows a further exemplary embodiment of a probe-like heating and cooling device. This has a UV lamp 36 which can be used to provide a layer formation process with UV radiation as heating energy in the broader sense. Cooling ducts 33 are also provided in the probe.

What is claimed is:

1. A process for coating the inner walls of pipes, comprising the steps of:
    arranging a combined mobile heating and cooling device around or inside a pipe, the combined mobile heating and cooling device including a heating region configured to heat the pipe locally, a first cooling region arranged on a first side of the heating region and configured to cool the pipe locally, and a second cooling region arranged on a second side of the heating region opposite the first side and configured to cool the pipe locally,
    feeding a fluid containing a coating material into the pipe, and
    moving the combined mobile heating and cooling device in a first direction along the pipe in which the first cooling region trails the heating region to heat the pipe locally using the heating region to a temperature required to form a first coating until the layer formation process is completed locally, and to cool the locally heated pipe using the first cooling region that trails the heating region, and
    moving the combined mobile heating and cooling device along the pipe in a second direction opposite the first direction and in which the second cooling region trails the heating region to heat the pipe locally using the heating region to the temperature required to form a second coating until the layer formation process is completed locally, and to cool the locally heated pipe using the second cooling region that trails the heating region.

2. The process according to claim 1, wherein a plurality of heating devices and cooling devices are used at the same time.

3. The process according to claim 1, wherein the combined mobile heating and cooling device is moved continuously along the longitudinal extent of the pipe, wherein the speed is selected subject to the local heating and cooling duration required.

4. The process according to claim 1, wherein the fluid contains precursors for a ceramic which are chemically converted to give a metal compound which forms the ceramic, with the layer being formed.

5. The process according to claim 1, wherein the fluid is liquefied and the pipe has a straight profile, wherein the pipe is held at an angle of more than 0° and at most 90° to gravitational acceleration and is rotated during the coating process.

6. A combined heating and cooling device for forming a coating on an interior wall of a pipe, comprising:
    a probe configured for insertion inside the pipe, the probe including at least one heating region and at least one cooling region which are arranged in succession in a longitudinal direction of the pipe,
    a fluid supply device integrated with the probe and configured to direct a stream of a fluid containing a coating material to the interior wall of the pipe, wherein the heating and cooling regions of the probe are configured to successively heat and cool the fluid applied to the interior wall of the pipe by the integrated fluid supply device to form a coating on the interior wall of the pipe, and wherein the heating and cooling regions are adapted to an interior cross section of the pipe in such a manner to provide uniform heating and the cooling of the fluid around a circumference of the pipe in a region of influence of the heating region and of the cooling region.

7. The heating and cooling device according to claim 6, wherein first and second cooling regions is arranged on opposite sides of a particular heating region.

8. The heating and cooling device according to claim 6, wherein a plurality of heating regions and cooling regions are arranged in succession.

9. A process for coating the inner walls of pipes, comprising the steps of:
inserting a heating and cooling probe inside a pipe, the heating and cooling probe including a heating device and a cooling device arranged in a following manner relative the heating device in a longitudinal direction of the pipe,
using a fluid supply device integrated with the probe to apply a fluid containing the coating material to an interior wall of the pipe,
heating the pipe locally using the heating device to a temperature required to form the coating until the layer formation process is completed locally, and moving the heating and cooling probe continuously until the layer to be formed is completed, and
cooling the pipe locally using the cooling device following the heating device.

10. The process according to claim 9, wherein a plurality of heating devices and cooling devices are used at the same time.

11. The process according to claim 9, wherein the at least one cooling device and the at least one heating device are moved continuously along the longitudinal extent of the pipe, wherein the speed is selected subject to the local heating and cooling duration required.

12. The process according to claim 9, wherein the fluid contains precursors for a ceramic which are chemically converted to give a metal compound which forms the ceramic, with the layer being formed.

13. The process according to claim 9, wherein the fluid is liquefied and the pipe has a straight profile, wherein the pipe is held at an angle of more than 0° and at most 90° to gravitational acceleration and is rotated during the coating process.

* * * * *